US012578689B2

(12) United States Patent
Schmid et al.

(10) Patent No.: US 12,578,689 B2
(45) Date of Patent: Mar. 17, 2026

(54) METHOD, MEASUREMENT SYSTEM CONTROLLER, AND MEASUREMENT SYSTEM

(71) Applicant: ROHDE & SCHWARZ GMBH & CO. KG, Munich (DE)

(72) Inventors: Bjoern Schmid, Munich (DE); Sebastian Roeglinger, Pfaffenhofen (DE); Thomas Schouwink, Zorneding (DE); Florian Lang, Gilching (DE); Jochen Pliquett, Glonn (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 449 days.

(21) Appl. No.: 18/170,359

(22) Filed: Feb. 16, 2023

(65) Prior Publication Data

US 2024/0280945 A1 Aug. 22, 2024

(51) Int. Cl.
*G05B 13/02* (2006.01)
(52) U.S. Cl.
CPC .................................. *G05B 13/021* (2013.01)
(58) Field of Classification Search
CPC .............. G05B 13/021; G05B 19/0423; G05B 2219/24215
See application file for complete search history.

(56) References Cited

U.S. PATENT DOCUMENTS

| | | | |
|---|---|---|---|
| 2011/0161964 A1* | 6/2011 | Piazza ................... | G06F 9/4881 718/102 |
| 2015/0078425 A1 | 3/2015 | Bremer et al. | |
| 2015/0336269 A1* | 11/2015 | Linnell ................... | B25J 9/1656 700/245 |
| 2016/0091587 A1* | 3/2016 | Benner ................ | G01R 33/543 324/322 |
| 2020/0064403 A1* | 2/2020 | Wendler ........... | G01R 31/31912 |
| 2021/0286035 A1* | 9/2021 | Kluge ................... | G01R 33/546 |

FOREIGN PATENT DOCUMENTS

| | | |
|---|---|---|
| CN | 107885675 B | 12/2019 |
| EP | 0552895 B1 | 12/1998 |

* cited by examiner

*Primary Examiner* — Christopher W Carter
(74) *Attorney, Agent, or Firm* — BROOKS KUSHMAN P.C.

(57) ABSTRACT

The present disclosure provides a method for operating a measurement system comprising at least one measurement application device, the method comprising receiving a sequence of control commands provided in the measurement system, automatically optimizing the recorded sequence of control commands for improving execution speed of the sequence of control commands in the measurement system, and controlling the measurement system based on the optimized sequence of control commands. Further, the present disclosure provides a respective measurement system controller, and a respective measurement system.

24 Claims, 7 Drawing Sheets receiving a sequence of control commands provided in the measurement system — S1 automatically optimizing the recorded sequence of control commands for improving execution speed of the sequence of control commands in the measurement system — S2 controlling the measurement system based on the optimized sequence of control commands — S3

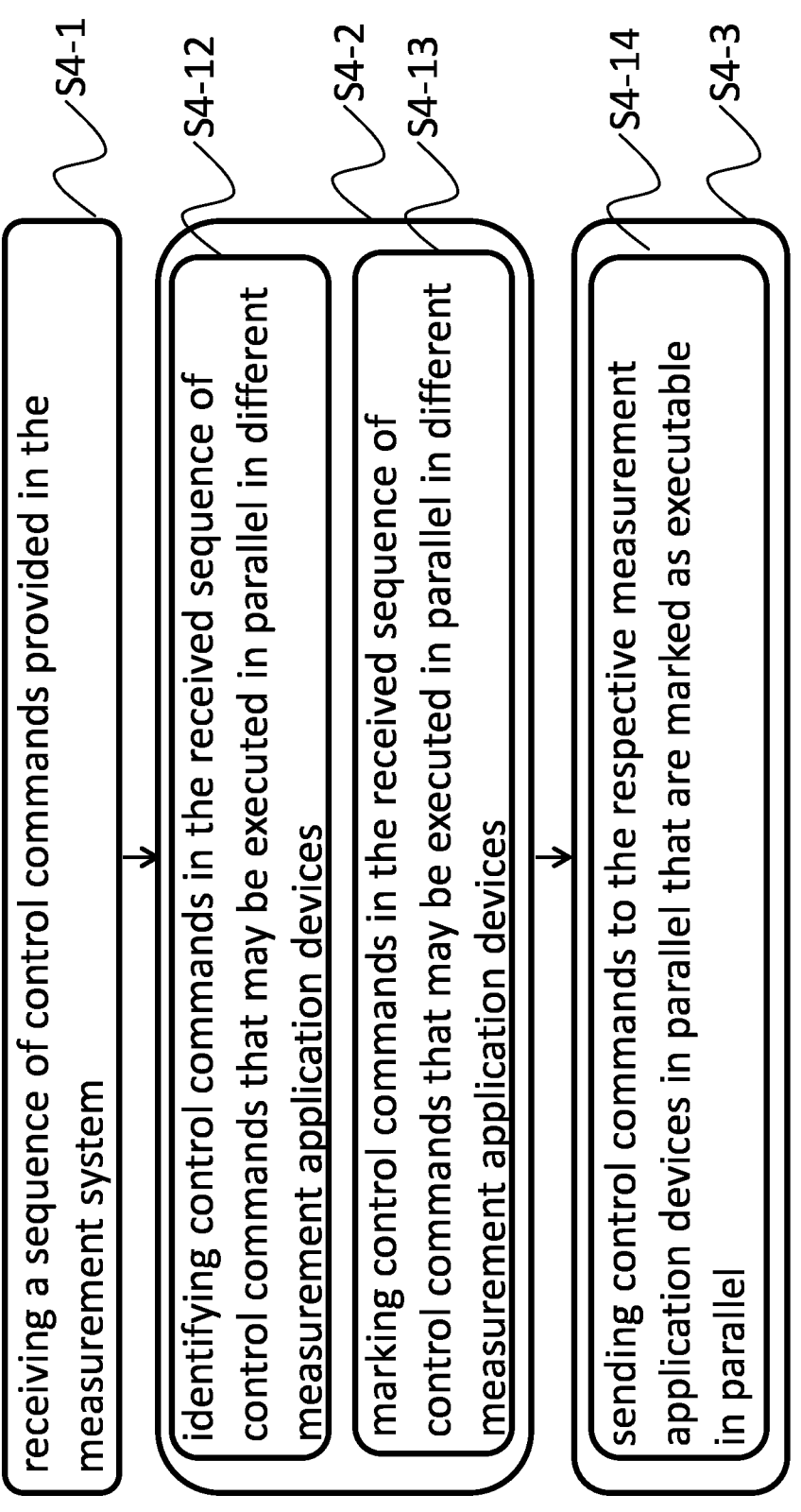

receiving a sequence of control commands provided in the measurement system — S4-1 identifying control commands in the received sequence of control commands that may be executed in parallel in different measurement application devices — S4-12 marking control commands in the received sequence of control commands that may be executed in parallel in different measurement application devices — S4-2, S4-13 sending control commands to the respective measurement application devices in parallel that are marked as executable in parallel — S4-14, S4-3

Fig. 4

METHOD, MEASUREMENT SYSTEM CONTROLLER, AND MEASUREMENT SYSTEM

TECHNICAL FIELD

The disclosure relates to a method for operating a measurement system. Further, the present disclosure relates to a measurement system controller, and a measurement system.

BACKGROUND

Although applicable to any type of measurement application device, the present disclosure will mainly be described in conjunction with setups of multiple measurement application devices.

In modern electronics development and maintenance, usually a plurality of measurements tasks needs to be performed.

In complex measurement systems, the single measurement application devices may be programmed, for example, manually or via a control command set like the SCPI control commands.

When programming complex measurement systems with multiple measurement application devices, a user may provide non-optimal control command sequences.

Accordingly, there is a need for improving control of measurement systems.

SUMMARY

The above stated problem is solved by the features of the independent claims. It is understood, that independent claims of a claim category may be formed in analogy to the dependent claims of another claim category.

Accordingly, it is provided:

A method, especially a computer-implemented method, for operating a measurement system comprising at least one measurement application device, the method comprising receiving a sequence of control commands provided in the measurement system, automatically optimizing the recorded sequence of control commands for improving execution speed of the sequence of control commands in the measurement system, and controlling the measurement system based on the optimized sequence of control commands.

Further, it is provided:

A measurement system controller for operating a measurement system, the measurement system controller comprising a processor configured to perform a method according to any one of the embodiments provided herein. The controller may be provided with a non-transitory computer readable storage medium that comprises instructions that when executed by the processor cause the processor to perform a method according to any one of the embodiments provided herein.

Further, it is provided:

A measurement system comprising a measurement system controller according to the present disclosure, and at least one measurement application device communicatively coupled to the measurement system controller.

The present disclosure is based on the finding, that in complex measurement scenarios, programming the measurement system may be a difficult task that may require programming different measurement application devices to perform multiple measurements sequentially.

The present disclosure is further based on the finding that programming a measurement system based on respective commands, like SCPI commands, and user input e.g., via direct user input at a respective measurement application device and/or from a remote-control device, may result in repeated commands or command sequences or in commands or command sequences that cancel out previously provided commands or command sequences.

The present disclosure, therefore, provides a method, especially a computer-implemented method, and a measurement system controller for operating or controlling a measurement system with improved sequences of control commands.

It is understood, that in the context of the present disclosure, the measurement system may comprise a single measurement application device, or any other number of measurement application devices, as well as a single device under test, or any other number of devices under test.

A measurement application device may comprise any device that may be used in a measurement application to acquire an input signal or to generate an output signal, or to perform additional or supporting functions in a measurement setup. Such a measurement application device may comprise, for example, a signal acquisition device e.g., an oscilloscope, especially a digital oscilloscope, or a vector network analyzer. Such a measurement application device may also comprise a signal generation device e.g., a signal generator, especially an arbitrary signal generator or a vector signal generator. Further possible measurement application devices comprise devices like calibration standards, or measurement probe tips. Of course, at least some of the possible functions, like signal acquisition and signal generation, may be combined in a single measurement application device.

In embodiments, the measurement application device may also comprise pure data acquisition devices that are capable of acquiring an input signal and providing the acquired input signal as digital input signal to a respective data storage or application server. Such pure data acquisition devices not necessarily comprise a user interface or display. Instead, such pure data acquisition devices may be controlled remotely e.g., via a respective data interface, like a network interface or a USB interface. The same applies to pure signal generation devices that may generate an output signal without comprising any user interface or configuration input elements. Instead, such signal generation devices may be operated remotely via a data connection.

According to the present disclosure, a sequence of control commands is received. The term "receiving" in this regard may refer to a sequence of control commands being received from a user. The user may e.g., manually input the sequence of control commands or select a stored sequence of control commands.

A user may, for example, operate the measurement system to perform a specific measurement task. The user input provided by the user may be recorded for later reproduction as respective control commands as program file. However, even in a measurement system with only a single measurement application device, correctly configuring and operating the measurement system may be a complex task. Even experienced users may, consequently, not always provide an optimal sequence of control commands.

With the solution of the present disclosure, the received sequence is automatically optimized for improving execution speed of the sequence of control commands in the measurement system.

The expression "optimized" in this context may refer to the total execution speed or execution time of the sequence of control commands, not the execution speed of a single control command, being shorter or at the maximum equal to the execution speed of the original not-optimized sequence of control commands.

The measurement system may then be controlled based on the optimized sequence of control commands.

As indicated above, the measurement system may comprise a single measurement application device or a plurality of measurement application devices. Controlling the measurement system may, therefore, comprise transmitting the control commands of the optimized sequence to the single measurement application device or the plurality of measurement application devices.

In the context of the present disclosure, a control command may, as indicated above, refer to a user input that may be stored as respective control command. A control command may also refer to a control command received or loaded from any other source. For example, a measurement system controller in the measurement system may provide control commands to the single measurement application devices.

The measurement system controller, and especially the processor of the measurement system controller may be provided as at least one of a dedicated processing element e.g., a processing unit, a microcontroller, a field programmable gate array, FPGA, a complex programmable logic device, CPLD, an application specific integrated circuit, ASIC, or the like. The measurement system controller or the processor may at least in part also be provided as a computer program product comprising computer readable instructions that may be executed by a processing element. In a further embodiment, the measurement system controller or processor may be provided as addition or additional function or method to the firmware or operating system of a processing element that is already present in the respective application as respective computer readable instructions. Such computer readable instructions may be stored in a memory that is coupled to or integrated into the processing element. The processing element may load the computer readable instructions from the memory and execute them.

In addition, it is understood, that any required supporting or additional hardware may be provided like e.g., a power supply circuitry and clock generation circuitry.

With the solution of the present disclosure, a complex measurement system may be controlled in an optimized fashion, without the user needing the experience to directly provide fully optimized sequences of control commands.

Further embodiments of the present disclosure are subject of the further dependent claims and of the following description, referring to the drawings.

In the following, the dependent claims referring directly or indirectly to claim 1 are described in more detail. For the avoidance of doubt, the features of the dependent claims relating to the method can be combined in all variations with each other and the disclosure of the description is not limited to the claim dependencies as specified in the claim set. Further, the features of the other independent claims may be combined with any of the features of the dependent claims relating to the method in all variations, wherein respective apparatus elements may perform the respective method steps.

In an embodiment, which can be combined with all other embodiments of the method mentioned above or below, the method may further comprise identifying sub sequences in the received sequence of control commands.

A sub sequence may refer to a group of control commands, and may in cases comprise only one control command. A sub sequence may be seen as a group of repeatable control commands that may be reused in the operation of the measurement system.

In embodiments, identifying a sub sequence may comprise analyzing the received sequence of control commands for control commands, especially consecutive control commands, that refer to the same measurement application device and grouping these control commands into a sub sequence.

Identifying a sub sequence may, in embodiments, comprise identifying control commands, especially consecutive control commands, in the sequence that refer to the same functionality, of one or multiple measurement application devices, and grouping these control commands into a sub sequence. The "same functionality" may for example refer to setting internal parameters, setting attenuation or amplification parameters, and starting or stopping measurements or signal generation functions.

In embodiments, a control command or multiple control commands may comprise parameters that may be transmitted with the respective control command. Identifying the sub sequences may comprise identifying control commands in the sequence that may be generalized by including a parameter into the respective command, and storing such control commands as sub sequence. For example, a control command for setting an amplifier to a specific output power may be generalized by providing the output power as parameter of the sub sequence. As will be indicated in more detail below, such sub sequences may later be reused by providing their ID and the respective parameter values.

In embodiments, identifying a sub sequence may comprise analyzing the received sequence of control commands for at least one of specific control commands that are known or defined as indicating the start of a sub sequence, and specific control commands that are known or defined as indicating the end of a sub sequence. In an exemplary measurement system that uses SCPI commands, a "INIT: IMM" command may, for example, characterize the beginning of a sub sequence with a measurement being the first action in the sub sequence, or the end of a sub sequence with the measurement being the last action in the sub sequence.

Of course, any combination of the above-mentioned embodiments may be used when identifying sub sequences.

In embodiments, the sub sequences may be identified by a user manually. A user may e.g., select the control commands that form a sub sequence from the received sequence, or may input the control commands that form the sub sequence in order to identify the sub sequence.

In embodiments, a user may also provide names for automatically identified or manually identified sub sequences.

When identifying sub sequences, a user may manually identify a sub sequence by providing a respective sequence start control command and a respective sequence end control command in the sequence of control commands. In a measurement system that uses SCPI commands as control commands, a user may manually identify a sub sequence by providing a respective sequence start SCPI command and a respective sequence end SCPI command in the sequence of control commands. Such SCPI control commands may exemplarily comprise a string like "SCPI:REC:SEQ: START" and "SCPI:REC:SEQ:END"

For naming a respective sub sequence e.g., providing an ID for the sub sequence, the user may also use a respective control command. As above, in a measurement system that uses SCPI commands, a sequence naming SCPI control command may be used. Such a SCPI control command may exemplarily comprise a string like "SCPI:REC:NAME" and the intended name of the sub sequence as parameter. In embodiments, the sub sequence start control command may be combined with the naming command. With SCPI commands, a sub sequence start SCPI command may, for example, be combined with a name parameter. Such a SCPI command may e.g., comprise a string like "SCPI:REC:SEQ: START" followed by a name parameter.

Of course, such control commands may be inserted into the sequence of control commands e.g., at a user computer. In a measurement application device, the single sequences may then be identified and stored based on the control commands inserted by the user. It is understood, that the control commands may be generated and inserted based on any other user input, for example a visual selection, and that the user not necessarily needs to input the control commands manually.

In a further embodiment, which can be combined with all other embodiments of the method mentioned above or below, optimizing may comprise optimizing each one of the optimized sub sequences individually, and storing the optimized sub sequences.

As indicated above, a sub sequence may comprise one or more control commands regarding a single measurement application device or the same function of one or multiple measurement application devices.

Each one of the sub sequences may be individually optimized and stored to later reuse the optimized sub sequences.

Optimizing the sub sequences may be performed in the same way as the received sequence of control commands may be optimized. Therefore, any explanation given above or below regarding the optimization of the received sequence of control commands may also be applied to the single sub sequences.

In a further embodiment, which can be combined with all other embodiments of the method mentioned above or below, the method may further comprise assigning an individual ID to each one of the optimized sub sequences, wherein controlling the measurement system further comprises executing the optimized sub sequences in the measurement system.

A single control command e.g., a control command according to the SCPI standard, also called "Standard Commands for Programmable Instruments", may comprise a long string of characters, each character comprising an 8-bit value. Since the single sub sequences may each refer to one or multiple control commands, a full sub sequence may comprise many of these 8-bit values. Long strings or character sequences not only require an increased bandwidth for transmission, but also require parsing many characters in the receiving measurement application device.

In an embodiment, the single sub sequences may, therefore, be assigned individual IDs or identifiers, that allow unambiguously identifying the sub sequences that an ID or identifier refers to in the measurement system.

The sequence of control commands may, therefore, be translated into a sequence of IDs.

Such IDs may, in an embodiment, comprise numbers, either as direct number or a string representation of said number. The string representation may be used, since the measurement application devices usually are equipped with a string parses, however, a string-based number will still be smaller in terms of required bits or bytes than the respective control commands of a sub sequence.

The control commands may comprise thousands of possible control commands, each one of the control commands being up to hundreds of characters long. Using a string-based numerical ID for each one of the control commands or sub sequences will only use as a small fraction of the characters of a single control command i.e., the number of characters used up by said number. In an exemplary system with 999999s thousand of possible control commands or sub sequences or respective IDs, the ID will, for example, only consume six characters or six bytes for each one of the control commands or sub sequences.

Executing an optimized sub sequence in embodiments may comprise transmitting the respective control commands to the respective measurement application device or to respective multiple measurement application devices one by one. In such embodiments, the ID may serve to mark the respective sub sequence e.g., for later use or reference by the user.

Executing an optimized sub sequence, in embodiments, may comprise transmitting only the individual ID of the respective optimized sub sequence to the respective measurement application device or to respective multiple measurement application devices. In the measurement application devices, the IDs and the corresponding control commands for the optimized sub sequences may be stored e.g., in a look-up table. A measurement application device that receives the ID of a sub sequence for executing the sub sequence may then load the respective control commands for the received ID and execute the respective control commands.

In embodiments, a user may be provided with a user interface that may be used to show a list of identified sub sequences to the user. The list may also comprise the IDs of the identified sub sequences. The list may also serve to indicated to the user that a sub sequence is identified. Displaying the list of all identified sub sequences may, in embodiments, also be seen as indicating to the user that a sub sequence is identified.

Above, the process of identifying new sub sequences, optimizing the identified sub sequences, and executing the optimized sub sequences is described. Below, the process of using pre-stored sub sequences, for example, sub sequences generated as described above, with a newly received sequence of control commands will be described.

In another embodiment, which can be combined with all other embodiments of the method mentioned above or below, the method may further comprise identifying sub sequences in the received sequence of control commands that are stored for the measurement system, wherein controlling the measurement system comprises executing the respective stored sub sequences in the measurement system.

When receiving a sequence of control commands, the received sequence may be scanned for sub sequences. In this embodiment, identifying sub sequences refers to identifying sub sequences that have already been identified for the measurement system before, and that may now be re-used.

Therefore, after identifying a sub sequence that has already been identified, optimized, and stored earlier, the respective optimized and stored sub sequence may be used instead of the sub sequency in the newly received sequence of control commands.

Of course, using pre-stored sub sequences may also be combined with identifying new sub sequences in a newly received sequence of control commands, as explained above.

In a further embodiment, which can be combined with all other embodiments of the method mentioned above or below, a sub sequence may be identified if at least a predetermined number of control commands of a sub sequence are identified in the received sequence of control commands.

Identifying a sub sequence, in any of the embodiments presented above and below, may comprise identifying all commands of the optimized, stored sub sequence or of the original sub sequence that was optimized and stored.

In embodiments, a sub sequence may also be identified as soon as at least the predetermined number e.g., between 1 and 100, especially between 1 and 20, or between 3 and 8, or 5, of control commands of the optimized, stored sub sequence or of the original sub sequence that was optimized and stored is identified in the newly received sequence. This embodiments may be seen as using a kind of best guess principle regarding newly detected sub sequences. This may e.g., speed up the initialization of the measurement setup.

For example, long running control commands that bring a device up to operating temperature, or that wait for a device to get to operating temperature usually may block the measurement system for a long time. If a sub sequence with such a control command is already identified before the measurement system is blocked by said command, other control commands, or sub sequences may already be processed earlier the same measurement system device, or in parallel in different measurement application devices.

In another embodiment, which can be combined with all other embodiments of the method mentioned above or below, each one of the sub sequences may comprise control commands for a specific measurement application device of the measurement system.

The control commands in the received sequence may be grouped into sub sequences by grouping all control commands for a specific measurement application device into the same sub sequence.

A sub sequence may be identified for consecutive control commands in the received sequence that all refer to the same measurement application device. As soon as a control command is received that refers to another measurement application device, the sub sequence may be closed or finished, and a new sub sequence may be started.

In embodiments, a sub sequence may be identified or created with control commands that refer to the same measurement application device but are not consecutively provided in the received sequence. This allows generating larger sub sequences and improves the level of optimization.

In embodiments, single sub sequences may be identified only for consecutive control commands that refer to the same measurement application device. If multiple sub sequences for the same measurement application device are identified these different sub sequences may be combined into a single new sub sequence.

Prior to grouping non-consecutive control commands into a sub sequence, it may be verified that there exist no entanglements between control commands for different measurement application devices that are regrouped in the sub sequences. The expression "entanglements" in this regard refers to control commands for a first measurement application device that may influence the operation of another measurement application device.

In an example, a control command may initiate the generation of a signal in a first measurement application device that is acquired by a second measurement application device. A sequence of control commands may comprise control commands that setup the first measurement application device, control commands that setup the second measurement application device, control commands that initiate the signal generation in the first measurement application device, and control commands that start the measurement in the second measurement application device.

In such an example, the control commands that start the signal generation in the first measurement application device will not be grouped with the control commands that setup the first measurement application device. This prevents the signal from being generated prior to setting up the second measurement application device for receiving the signal.

In a further embodiment, which can be combined with all other embodiments of the method mentioned above or below, when automatically optimizing, predetermined control commands may not be optimized.

There may exist control commands that are critical and should, therefore, not be optimized.

Critical commands may, for example, be commands that refer to settings of parameters in measurement application devices that control the generation and acquisition of signals in the measurement system. Since the correct generation and acquisition of signals in a measurement system is essential, respective control commands may be left unchanged or unoptimized.

A user may also be offered a user interface for manually defining which control commands should be treated as critical control commands.

For each such critical control command a dedicated sub sequence may be generated.

In another embodiment, which can be combined with all other embodiments of the method mentioned above or below, optimizing may comprise at least one of reordering the control commands in a received sequence of control commands, deleting control commands, especially control commands that are overwritten by any one of the following control commands prior to performing any measurement action, and generalizing a control command, especially by inserting variables into the respective control command.

Reordering may refer to sorting the control commands in a fashion that improves the overall execution speed of the sequence in the measurement system.

Deleting control commands may be used to optimize the sequence, whenever a control command is detected that does not generate any noticeable effect in the measurement system. Control commands that do not generate any noticeable effect in the measurement system may, for example, comprise control commands that are overwritten by any of the following control commands. Of course, a time limit or a limit based on a specific action may be set for the number of following control commands.

For example, a control command may set an output power of an amplifier. Later another output power may be set for that amplifier. If between the two control commands only a predetermined number of control commands or less, or no signal generation command for the amplifier or a device supplying the amplifier with an input signal (specific action), is generated, the first command for setting the output power may be removed.

Generalizing may be applied to control commands that comprise parameters. Using the above-mentioned example, when setting an output power for an amplifier, the control command may for any given output power be the same control command, while only the output power may vary from instance to instance.

Such control commands may be generalized by storing the control command with an indication that a parameter may be given and what parameter may be given. Of course, this also applies to more than one parameter.

When re-using the stored control command, the reference or ID of the stored control command together with the parameter(s) may be used.

In a further embodiment, which can be combined with all other embodiments of the method mentioned above or below, optimizing may further comprise identifying control commands that require a predetermined time to execute in the at least one measurement application device, and moving the identified control commands to an earlier slot in the sequence of control commands.

With this embodiment, control commands with a long execution time that may block only some other control commands, and may allow other control commands to be executed concurrently may be positioned at the front of the sequence.

For example, a control command that starts up a measurement application device and waits for the measurement application device to get to operating temperature, may allow execution of further configuration control commands e.g., for configuration, but may block execution of measurement or signal generation control commands.

When reordering the control commands, the command for starting up a measurement application device and waiting for the measurement application device to get to operating temperature may be executed early in the sequence, followed by configuration control commands. The control commands for starting signal generation or a measurement may then be executed after the command for starting up the measurement application device completes. If, instead, a user would put such control commands at the end of the sequence, the total execution time of the sequence would be longer.

In another embodiment, which can be combined with all other embodiments of the method mentioned above or below, when the measurement system comprises two or more measurement application devices, automatically optimizing may comprise identifying and marking control commands in the received sequence of control commands that may be executed in parallel in different measurement application devices, and wherein, when the measurement system comprises two or more measurement application devices, controlling may comprise sending control commands to the respective measurement application devices in parallel that are marked as executable in parallel.

In a measurement system with multiple measurement application devices control commands may be provided in the sequence for the different measurement application devices. A user may not always choose the optimal order of the control commands.

For example, some control commands may be executed in different measurement application devices in parallel, because they do not influence the execution of control commands in other measurement application devices.

However, a user may control the measurement application devices one after the other, without taking into account parallel control of the single measurement application devices.

Such control commands may be reordered such that parallel command execution in the measurement system is maximized.

In a further embodiment, which can be combined with all other embodiments of the method mentioned above or below, when receiving a sequence of control commands, the single control commands may be received at least one of via a user input device, via a digital data interface, and from a database.

As indicated above, the single control commands or the sequence of control commands may, at least in part, be provided by a user via an input device. Such a user input device may be provided on any one or multiple ones of the measurement application devices as input elements of the respective measurement application device.

Such a user input device may also be provided on a central control unit, like a computer or PC. In embodiments, the central control unit may be a server or cloud service and the user input device may be provided as a website served by said server or cloud service. The measurement system controller may comprise such a central control unit.

The sequence of control commands may also, at least in part, be provided via a digital data interface, for example, from a device that stores and reproduces control commands. Such a device may be the above-mentioned server or cloud service. In embodiments, such a device may be a recorder provided in the measurement system, either as dedicated recording device or integrated into any one of the measurement application devices.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which:

FIG. 4 shows a further flow diagram of a method according to the present disclosure;

In the figures like reference signs denote like elements unless stated otherwise.

DETAILED DESCRIPTION OF THE DRAWINGS

For sake of clarity in the following description of the method-based FIGS. 1-4 the reference signs used above in the description of apparatus-based FIGS. 5-7 will be maintained.

Figure 1:
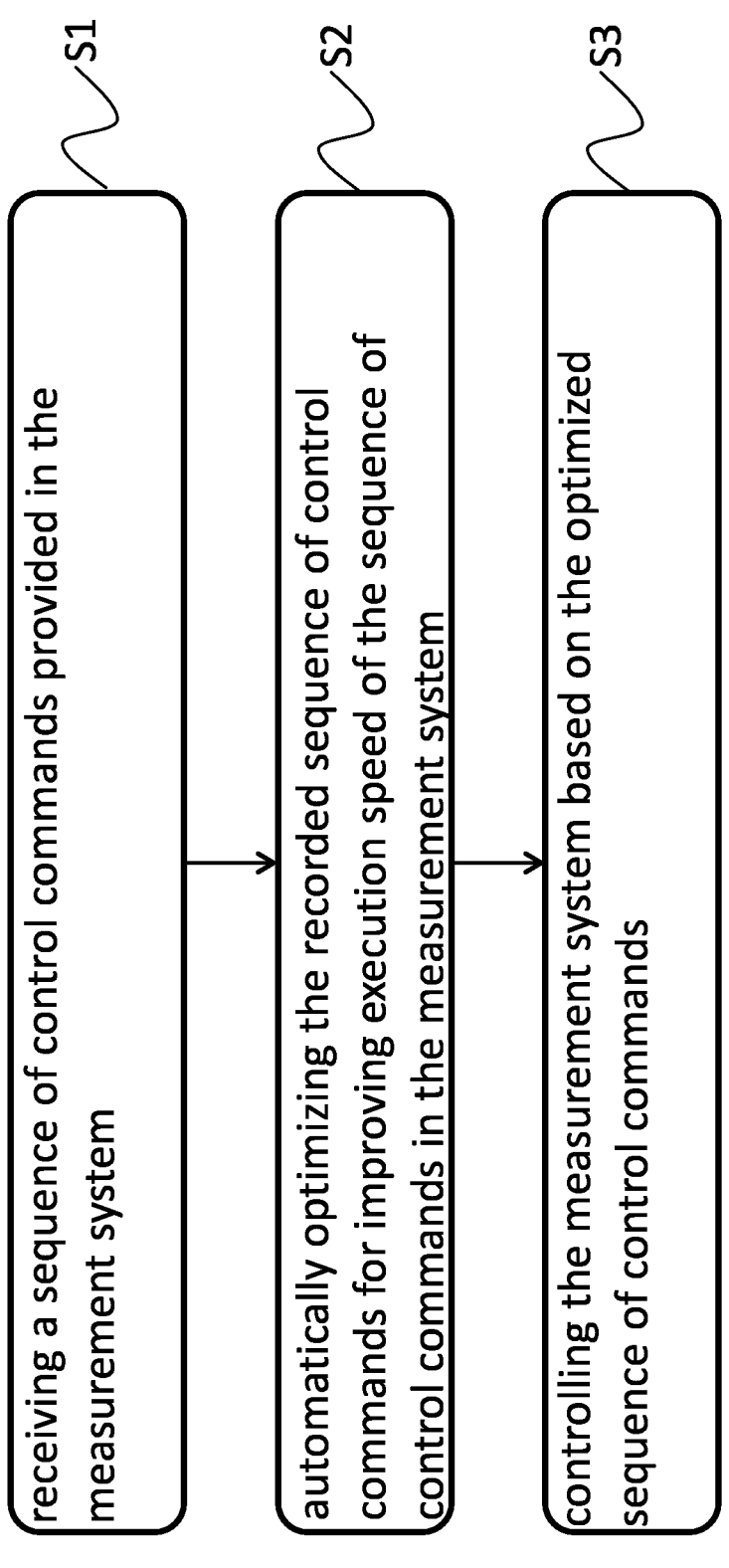
FIG. 1 shows a flow diagram of a method according to the present disclosure.

FIG. 1 shows a flow diagram of a method for operating a measurement system 100, 200 comprising at least one measurement application device 104, 204, OSC. The method comprises receiving S1 a sequence 106-1, 106-2 of control commands 107 provided in the measurement system 100, 200, automatically optimizing S2 the recorded sequence 106-1, 106-2 of control commands 107 for improving execution speed of the sequence 106-1, 106-2 of control commands 107 in the measurement system 100, 200, and controlling S3 the measurement system 100, 200 based on the optimized sequence 106-1, 106-2 of control commands 107.

The single control commands 107 may, for example, be received at least one of via a user input device, via a digital data interface, and from a database.

When automatically optimizing S2, predetermined control commands 107 may not be optimized or may be skipped. Such predetermined control commands 107 may e.g., comprise predetermined control commands 107 that are critical for the function of the measurement system 100, 200.

Automatically optimizing S2 may comprise at least one of reordering the control commands 107 in a received sequence 106-1, 106-2 of control commands 107, deleting control commands 107, especially control commands 107 that are overwritten by any one of the following control commands 107 prior to performing any measurement action, and generalizing a control command 107, especially by inserting variables into the respective control command 107.

Automatically optimizing S2 may e.g., comprise identifying control commands 107 that require a predetermined time to execute in the at least one measurement application device 104, 204, OSC, and moving the identified control commands 107 to an earlier slot in the sequence 106-1, 106-2 of control commands 107.

Figure 2:
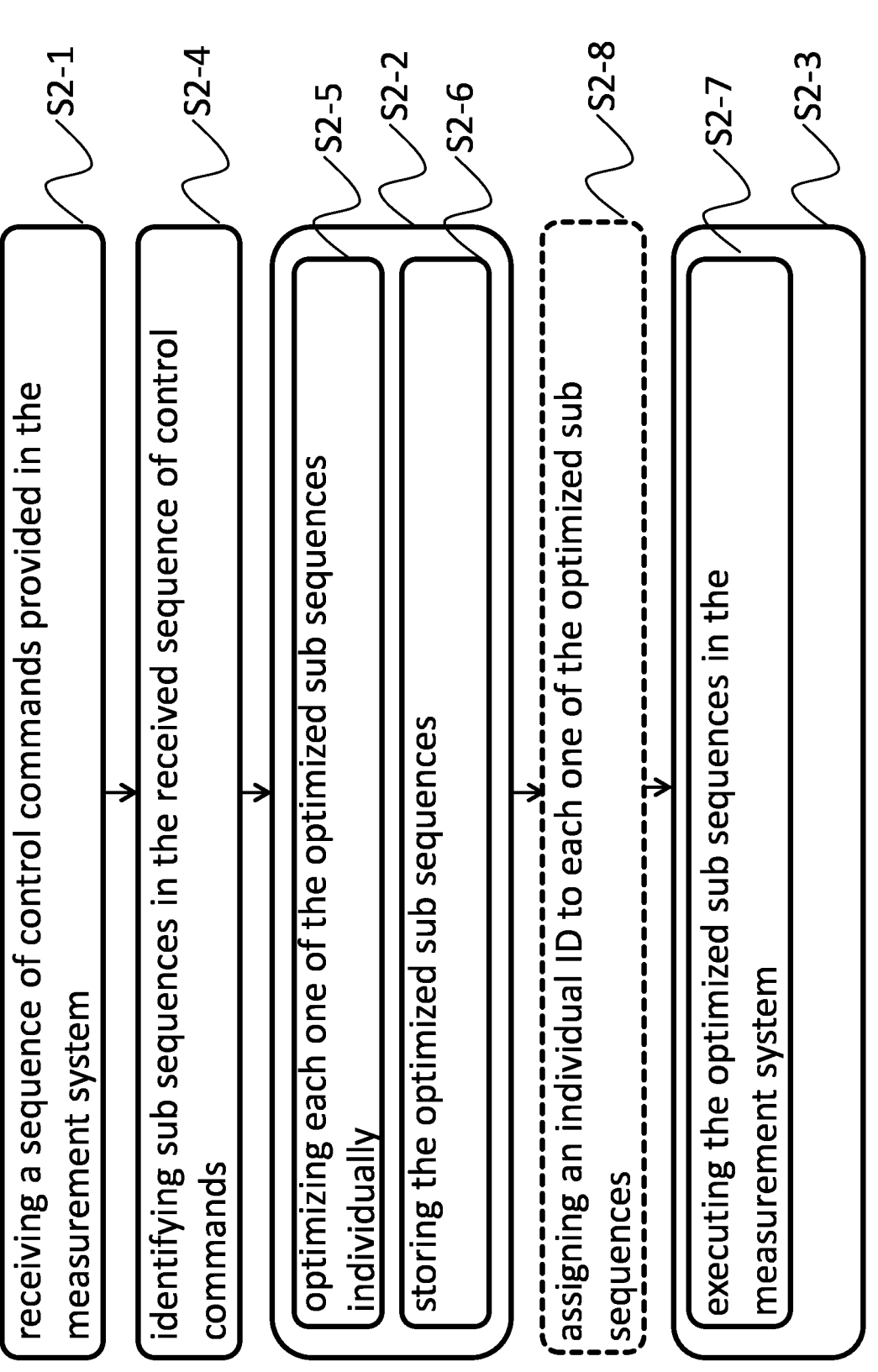
FIG. 2 shows another flow diagram of a method according to the present disclosure.

FIG. 2 shows flow diagram of a method for operating a measurement system 100, 200 that is based on the method of FIG. 1. The method comprises receiving S2-1 a sequence 106-1, 106-2 of control commands 107 provided in the measurement system 100, 200, automatically optimizing S2-2 the recorded sequence 106-1, 106-2 of control commands 107 for improving execution speed of the sequence 106-1, 106-2 of control commands 107 in the measurement system 100, 200, and controlling S2-3 the measurement system 100, 200 based on the optimized sequence 106-1, 106-2 of control commands 107.

The method further comprises identifying S2-4 sub sequences in the received sequence 106-1, 106-2 of control commands 107, optimizing S2-5 each one of the optimized sub sequences individually, and storing S2-6 the optimized sub sequences. When controlling the measurement system 100, 200 the optimized sub sequences are executed S2-7 in the measurement system 100, 200.

The method may further comprise an optional step of assigning S2-8 an individual ID to each one of the optimized sub sequences, for example, for later use.

The sub sequences may be formed such, that each one of the sub sequences comprises control commands 107 for a specific measurement application device 104, 204, OSC of the measurement system 100, 200.

Figure 3:
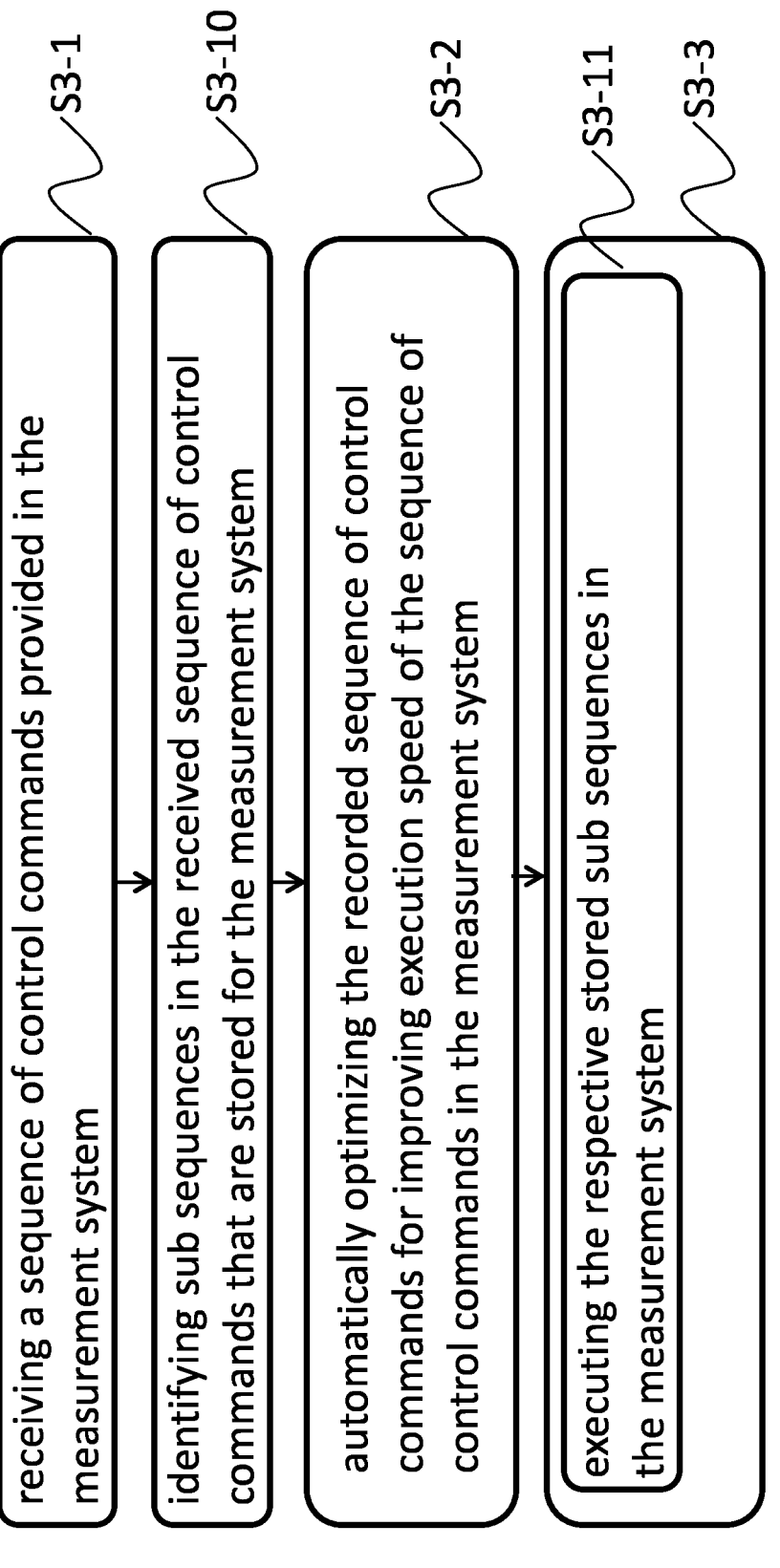
FIG. 3 shows a further flow diagram of a method according to the present disclosure.

FIG. 3 shows a flow diagram of a method for operating a measurement system 100, 200. The method comprises receiving S3-1 a sequence 106-1, 106-2 of control commands 107 provided in the measurement system 100, 200, automatically optimizing S3-2 the recorded sequence 106-1, 106-2 of control commands 107 for improving execution speed of the sequence 106-1, 106-2 of control commands 107 in the measurement system 100, 200, and controlling S3-3 the measurement system 100, 200 based on the optimized sequence 106-1, 106-2 of control commands 107.

The method further comprises identifying S3-10 sub sequences in the received sequence 106-1, 106-2 of control commands 107 that are already stored for the measurement system 100, 200. It is noted, that while identifying S3-10 may be performed based on the received or non-optimized sequence 106-1, 106-2 of control commands 107, the already stored sub sequences may refer to the optimized and stored sub sequences.

An already stored sub sequence may be identified if at least a predetermined number of control commands 107 of a sub sequence are identified in the received sequence 106-1, 106-2 of control commands 107.

Controlling S3-3 the measurement system 100, 200 may then comprises executing S3-11 the respective stored sub sequences in the measurement system 100, 200, instead of the received sequence 106-1, 106-2 of control commands 107.

FIG. 4 shows a flow diagram of a method for operating a measurement system 100, 200. The method comprises receiving S4-1 a sequence 106-1, 106-2 of control commands 107 provided in the measurement system 100, 200, automatically optimizing S4-2 the recorded sequence 106-1, 106-2 of control commands 107 for improving execution speed of the sequence 106-1, 106-2 of control commands 107 in the measurement system 100, 200, and controlling S4-3 the measurement system 100, 200 based on the optimized sequence 106-1, 106-2 of control commands 107.

The method of FIG. 4 may especially apply when the measurement system 100, 200 comprises two or more measurement application devices 104, 204, OSC, and further comprises in the step of automatically optimizing S4-2 identifying S4-12 and marking S4-13 control commands 107 in the received sequence 106-1, 106-2 of control commands 107 that may be executed in parallel in different measurement application devices 104, 204, OSC. In the step of controlling S4-3 the method further comprises sending S4-14 control commands 107 to the respective measurement application devices 104, 204, OSC in parallel that are marked as executable in parallel.

Figure 5:
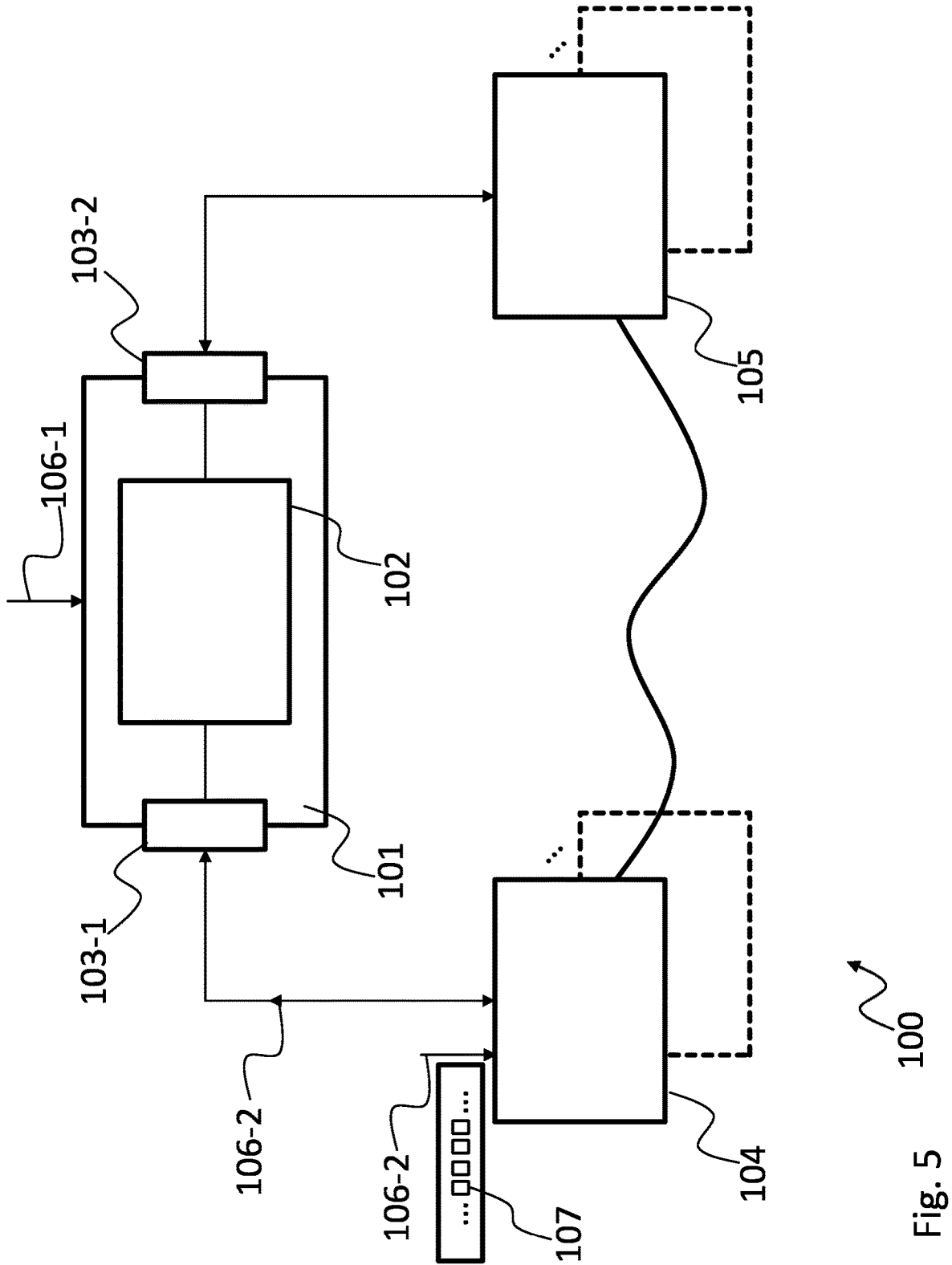
FIG. 5 shows a block diagram of a measurement system according to the present disclosure.

FIG. 5 shows a block diagram of a measurement system 100. The measurement system 100 comprises a measurement system controller 101 with a processor 102 that is coupled to a first communication interface 103-1 and to a second communication interface 103-2. The first communication interface 103-1 is externally coupled to a measurement application device 104, wherein more measurement application devices are hinted at by a dashed box. The second communication interface 103-2 is externally coupled to a device under test 105, wherein more devices under test are hinted at by a dashed box. It is understood, that the connections between the elements of the measurement system 100 are just exemplary, and may be different in other embodiments.

In the measurement system 100, a sequence 106-1 of control commands 107 is received at the measurement application device 104 and provided to the measurement system controller 101. Further, a sequence 106-2 is received directly at the measurement system controller 101.

The processor 102 may be configured to implement any one of the embodiments of the method according to the present disclosure presented above or below. To this end, a memory, especially a non-transitory computer-readable memory, with respective computer readable instructions that when executed by the processor 102 cause the processor 102 to perform the respective method may be provided.

It is understood, that the measurement system controller 101, and especially the processor 102, my be implemented as a dedicated or single device. In embodiments, the measurement system controller 101, and especially the processor 102, may be implemented as distributed or multiple elements, and may especially at least in part be implemented in the measurement application device 104.

Figure 6:
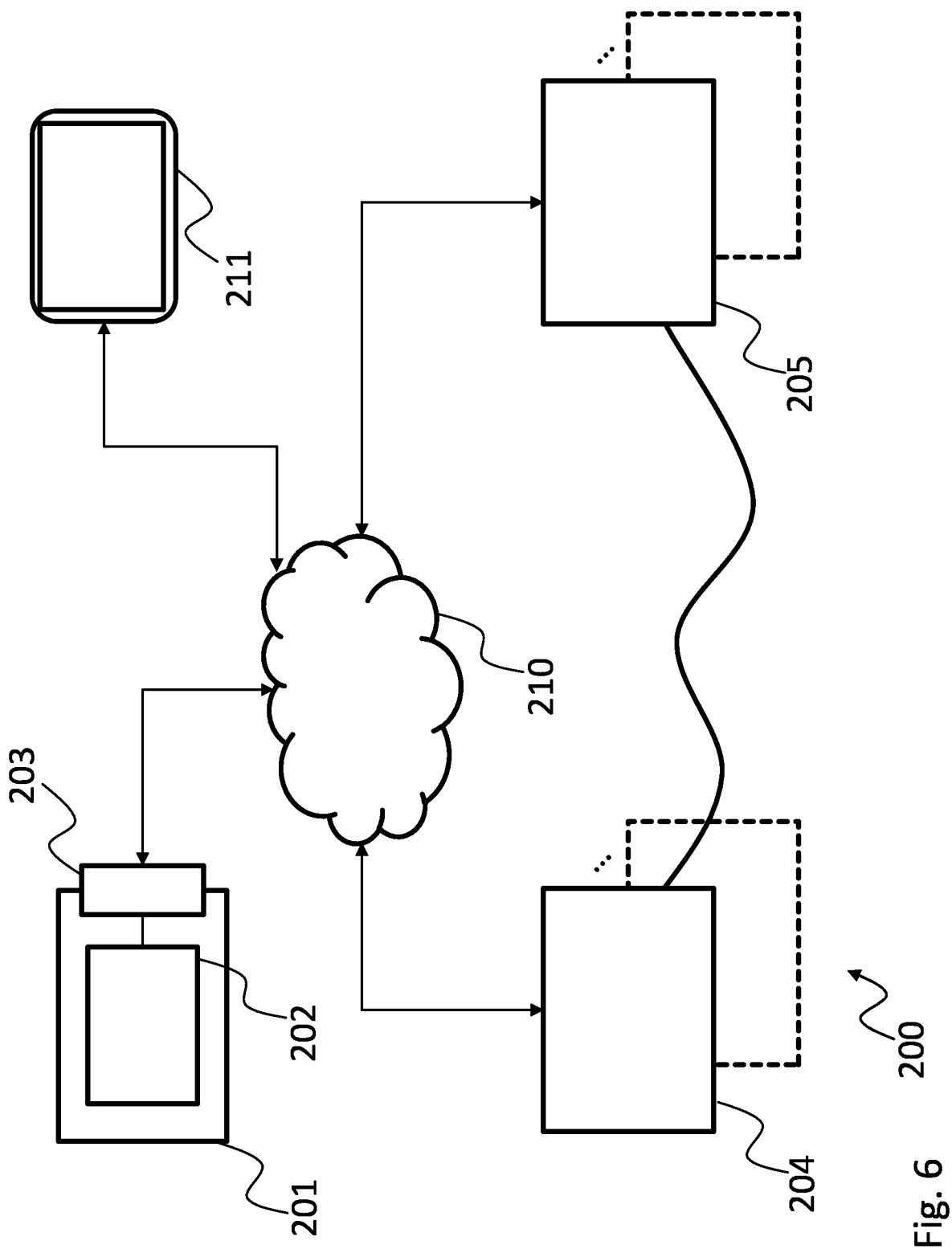
FIG. 6 shows a block diagram of a further measurement system according to the present disclosure.

FIG. 6 shows a block diagram of a measurement system 200. The measurement system 200 is based on the measurement system 100. Therefore, the measurement system 200 comprises a measurement system controller 201 with a processor 202 that is coupled to a communication interface 203. The measurement system 200 further comprises a measurement application device 204, wherein more measurement application devices are hinted at by a dashed box. Further, the measurement system 200 comprises a device under test 205, wherein more devices under test are hinted at by a dashed box.

Instead of being directly coupled to the measurement application device 204 and the device under test 205, the measurement system controller 201 is coupled to a network 210, which is coupled to the measurement application device 204 and the device under test 205. It is understood, that the connections between the elements of the measurement system 200 are just exemplary, and may be different in other embodiments.

Further, the measurement system 200 comprises a user device 211 that is also coupled to the network 210. The user device 211 may be used by a user to control the measurement system 200, instead of interacting with the measurement system controller 201 or the measurement application device 204.

It is understood, that the network 210 may be a local network at the premises of the user. Alternatively, the network 210 may at least in part comprise an external or public network, like the Internet. Further, the network 210 may comprise any type of network devices, like switches, hubs, routers, firewalls, and different types of network technologies.

Figure 7:
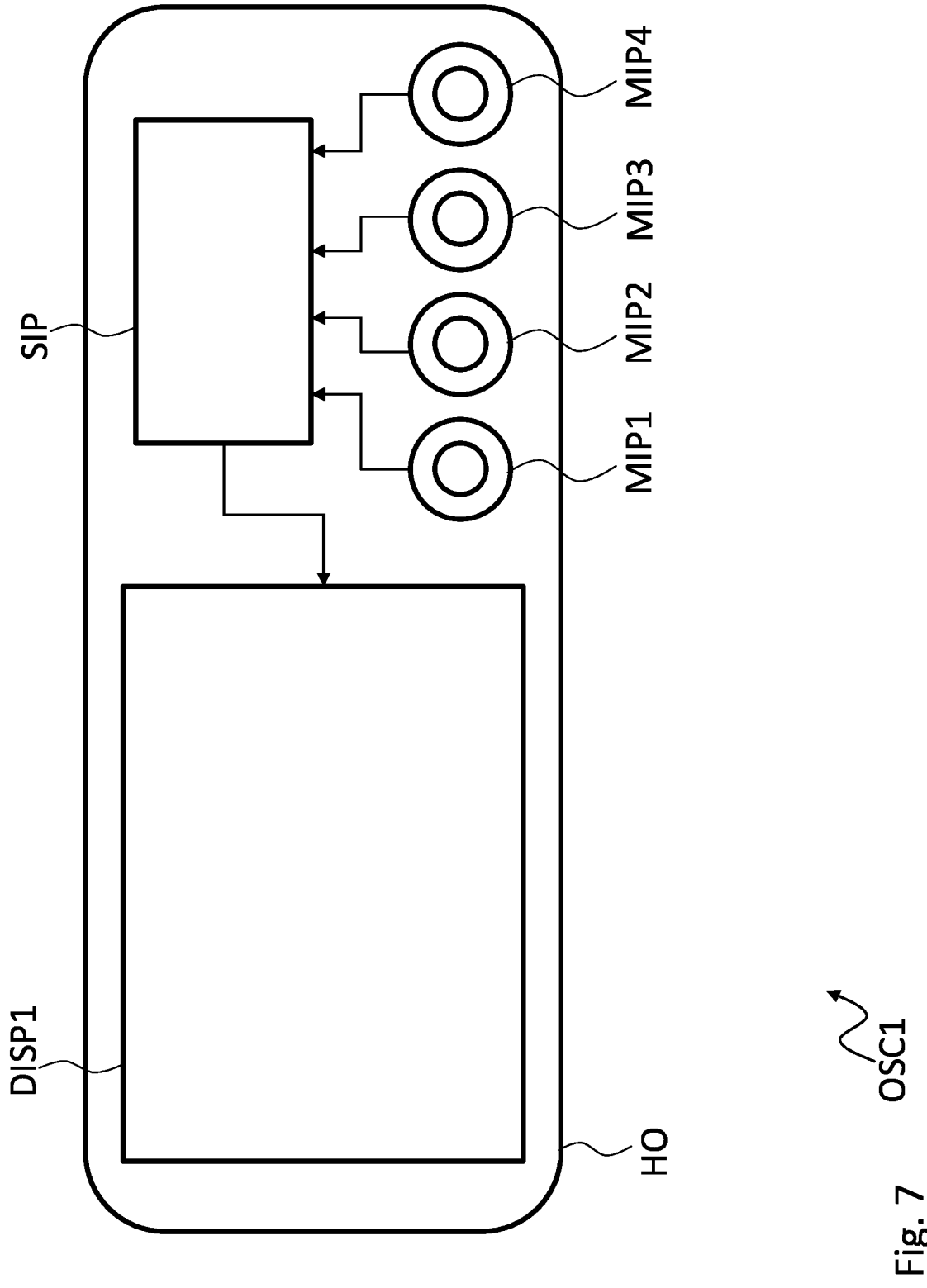
FIG. 7 shows a block diagram of a measurement application device according to the present disclosure.

FIG. 7 shows a block diagram of an oscilloscope OSC1 that may be used with an embodiment of a differential measurement probe according to the present disclosure.

The oscilloscope OSC1 comprises a housing HO that accommodates four measurement inputs MIP1, MIP2, MIP3, MIP4 that are coupled to a signal processor SIP for processing any measured signals. The signal processor SIP is coupled to a display DISP1 for displaying the measured signals to a user.

In embodiments, the oscilloscope OSC1 comprises a network interface for communicating with other elements of a measurement system. Further, the signal processor SIP may be configured to perform any embodiment of the method according to the present disclosure described above or below. The explanations provided above for the processor 102, 202 may, therefore, also apply to the signal processor SIP Although not explicitly shown, it is understood, that the oscilloscope OSC1 may also comprise signal outputs that may also be coupled to the differential measurement probe. Such signal outputs may for example serve to output calibration signals. Such calibration signals allow calibrating the measurement setup prior to performing any measurement. The process of calibrating and correcting any measurement signals based on the calibration may also be called de-embedding and may comprise applying respective algorithms on the measured signals.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS

S1, S2-1, S3-1, S4-1, S2, S2-2, S3-2 method steps
S4-2, S3, S2-2, S3-3, S4-3, S3, S2-3 method steps
S3-3, S4-3, S2-4, S2-5, S2-6, S2-7 method steps
S2-8, S3-10, S3-11, S4-12, S4-13, S4-14 method steps
100, 200 measurement system
101, 201 measurement system controller
102, 202 processor
103-1, 103-2, 203 communication interface
104, 204 measurement application device
105, 205 device under test
106-1, 106-2 sequence
107 control command
210 network
211 user device
OSC1 oscilloscope
HO housing
MIP1, MIP2, MIP3, MIP4 measurement input
SIP signal processing
DISP1 display

What is claimed is:

1. A method for operating a measurement system comprising at least one measurement application device, the method comprising:

receiving a sequence of control commands provided in the measurement system;

identifying sub sequences in the received sequence of control commands, wherein:

identifying a sub sequence comprises analyzing the received sequence of control commands for control commands that refer to the same measurement application device and grouping these control commands into a sub sequence, or identifying a sub sequence comprises identifying control commands in the received sequence of control commands that refer to the same functionality of one or multiple measurement application devices and grouping these control commands into a sub sequence;

automatically optimizing the received sequence of control commands for improving execution speed of the sequence of control commands in the measurement system; and controlling the measurement system based on the optimized sequence of control commands.

2. The method according to claim 1, wherein automatically optimizing further comprises optimizing each one of the sub sequences individually, and storing the optimized sub sequences, and wherein controlling the measurement system further comprises executing the optimized sub sequences in the measurement system.

3. The method according to claim 2, further comprising assigning an individual ID to each one of the optimized sub sequences.

4. The method according to claim 1, further comprising:

identifying sub sequences in the received sequence of control commands that are stored for the measurement system;

wherein controlling the measurement system further comprises executing the respective stored sub sequences in the measurement system.

5. The method according to claim 4, wherein a sub sequence is identified if at least a predetermined number of control commands of a sub sequence are identified in the received sequence of control commands.

6. The method according to claim 4, wherein each one of the sub sequences comprises control commands for a specific measurement application device of the measurement system.

7. The method according to claim 1, wherein when automatically optimizing, predetermined control commands are not optimized.

8. The method according to claim 1, wherein automatically optimizing further comprises at least one of:

reordering the control commands in a received sequence of control commands;

deleting control commands, including control commands that are overwritten by any one of the following control commands prior to performing any measurement action; and generalizing a control command, including inserting variables into the respective control command.

9. The method according to claim 1, wherein automatically optimizing further comprises:

identifying control commands that require a predetermined time to execute in the at least one measurement application device; and moving the identified control commands to an earlier slot in the sequence of control commands.

10. The method according to claim 1, wherein, when the measurement system comprises two or more measurement application devices, automatically optimizing further comprises:

identifying and marking control commands in the received sequence of control commands that may be executed in parallel in different measurement application devices;

wherein, when the measurement system comprises two or more measurement application devices, controlling further comprises sending control commands to the respective measurement application devices in parallel that are marked as executable in parallel.

11. The method according to claim 1, wherein when receiving a sequence of control commands, the single control commands are received at least one of:

via a user input device;

via a digital data interface; and from a database.

12. A measurement system controller for operating a measurement system, the measurement system controller comprising:

a processor configured to perform a method for operating a measurement system comprising at least one measurement application device, the method comprising:

receiving a sequence of control commands provided in the measurement system;

identifying sub sequences in the received sequence of control commands, wherein:

identifying a sub sequence comprises analyzing the received sequence of control commands for control commands that refer to the same measurement application device and grouping these control commands into a sub sequence, or identifying a sub sequence comprises identifying control commands in the received sequence of control commands that refer to the same functionality of one or multiple measurement application devices and grouping these control commands into a sub sequence;

automatically optimizing the received sequence of control commands for improving execution speed of the sequence of control commands in the measurement system; and controlling the measurement system based on the optimized sequence of control commands.

13. The measurement system controller according to claim 12, wherein automatically optimizing further comprises optimizing each one of the optimized sub sequences individually, and storing the optimized sub sequences, and wherein controlling the measurement system further comprises executing the optimized sub sequences in the measurement system.

14. The measurement system controller according to claim 13, further comprising assigning an individual ID to each one of the optimized sub sequences.

15. The measurement system controller according to claim 12, further comprising:

identifying sub sequences in the received sequence of control commands that are stored for the measurement system;

wherein controlling the measurement system further comprises executing the respective stored sub sequences in the measurement system.

16. The measurement system controller according to claim 15, wherein a sub sequence is identified if at least a predetermined number of control commands of a sub sequence are identified in the received sequence of control commands.

17. The measurement system controller according to claim 13, wherein each one of the sub sequences comprises control commands for a specific measurement application device of the measurement system.

18. The measurement system controller according to claim 12, wherein when automatically optimizing, predetermined control commands are not optimized.

19. The measurement system controller according to claim 12, wherein automatically optimizing further comprises at least one of:

reordering the control commands in a received sequence of control commands;

deleting control commands, including control commands that are overwritten by any one of the following control commands prior to performing any measurement action; and generalizing a control command, including by inserting variables into the respective control command.

20. The measurement system controller according to claim 12, wherein automatically optimizing further comprises:

identifying control commands that require a predetermined time to execute in the at least one measurement application device; and moving the identified control commands to an earlier slot in the sequence of control commands.

21. The measurement system controller according to claim 12, wherein, when the measurement system comprises two or more measurement application devices, automatically optimizing further comprises:

identifying and marking control commands in the received sequence of control commands that may be executed in parallel in different measurement application devices; and wherein, when the measurement system comprises two or more measurement application devices, controlling further comprises sending control commands to the respective measurement application devices in parallel that are marked as executable in parallel.

22. The measurement system controller according to claim 12, wherein when receiving a sequence of control commands, the single control commands are received at least one of:

via a user input device;

via a digital data interface; and from a database.

23. A measurement system comprising:

a measurement system controller according to claim 12; and at least one measurement application device communicatively coupled to the measurement system controller.

24. The measurement system according to claim 23, wherein the measurement system controller further comprises at least one of:

a dedicated control device;

a cloud-based server; and a measurement application device.

* * * * *